United States Patent [19]

Goldstein

[11] Patent Number: 4,538,779

[45] Date of Patent: Sep. 3, 1985

[54] CASTER TYPE EMPENNAGE ASSEMBLY FOR AIRCRAFT

[75] Inventor: Sidney E. Goldstein, Kirkland, Wash.

[73] Assignee: The Boeing Company, Seattle, Wash.

[21] Appl. No.: 429,259

[22] Filed: Sep. 30, 1982

[51] Int. Cl.$^3$ .............................................. B64C 5/10
[52] U.S. Cl. ..................................... 244/87; 244/91; 244/76 R; 244/225
[58] Field of Search .................. 244/76 B, 87, 88, 91, 244/199, 182, 225, 90 R, 75 R, 76 R

[56] References Cited

U.S. PATENT DOCUMENTS

| 2,326,819 | 8/1943 | Berlin | 244/87 |
| 2,559,827 | 7/1951 | Northrop | 244/91 |
| 2,744,698 | 5/1956 | Baynes | 244/87 |
| 2,774,556 | 12/1956 | Robert | 244/46 |
| 3,260,481 | 7/1966 | Winborn | 244/218 |
| 4,247,062 | 1/1981 | Brueckner | 244/87 |

FOREIGN PATENT DOCUMENTS

| 1283097 | 11/1968 | Fed. Rep. of Germany | 244/91 |
| 2804018 | 8/1979 | Fed. Rep. of Germany | 244/87 |
| 454666 | 1/1946 | Italy | 244/91 |
| 145770 | 7/1920 | United Kingdom | 244/88 |

Primary Examiner—Trygve M. Blix
Assistant Examiner—Rodney Corl
Attorney, Agent, or Firm—Schwartz & Weinrieb

[57] ABSTRACT

An empennage assembly for supersonic aircraft includes longitudinally and rearwardly extending booms (12) mounted upon the wings (16) or fuselage of the aircraft. The booms (12) include aft rotatable sections (22) upon which are mounted larger (18) and smaller (20) tail surfaces. The boom sections (22) are angularly rotated through angular displacements $\theta$ such that the dispositions of the tail surfaces (18, 20) are interchanged between their dispositions during low subsonic and high supersonic flight conditions. In this manner, the directional and longitudinal aerodynamic static stability components of the aircraft are rendered substantially constant at an optimum low or near-neutral level of stability in order to enhance the flight maneuverability capabilities of the aircraft throughout the subsonic, transonic, and high supersonic speed ranges. The empennage (10) is also advantageously employed for enhancing the directional stability characteristics of all aircraft under varied angle of attack conditions, and still further, can likewise enhance the lift characteristics of STOL aircraft employing vectored thrust. In connection with the use of the present invention empennage system upon supersonic aircraft, the rotational orientation of the empennage system (10) and its associated boom sections (22) is automatically programmed by suitable feed-back control means (23) in response to sensed changes in Mach number. In a similar manner, the rotational orientation of the empennage system (10) and its associated boom sections (22) would also be automatically programmed by the feed-back control means (23) as a function of angle of attack.

20 Claims, 18 Drawing Figures

FIG. 1B.
LOW SUBSONIC

FIG. 1C.
TRANSONIC

FIG. 1D.
HIGH SUPERSONIC

FIG. 2.
EFFECT OF θ ON AERODYNAMIC CENTER LOCATION

FIG. 3.
EFFECT OF θ ON DIRECTIONAL STABILITY

CASTER TYPE EMPENNAGE ASSEMBLY FOR AIRCRAFT

TECHNICAL FIELD

The present invention relates generally to aircraft, and more particularly to a caster or rotatable type empennage assembly for aircraft which enables the aircraft to achieve or experience a substantially constant and optimum level of aerodynamic static stability, throughout the subsonic, transonic and supersonic speed ranges whereby the maneuvering capabilities of the aircraft are substantially improved and maximized throughout such speed ranges. The present invention also maintains directional stability at high angles of attack and enhances aircraft handling qualities and performance, particularly during STOL operations.

BACKGROUND ART

Aerodynamic static stability is defined as the tendency of the aircraft to return to an initial state or condition subsequent to or following a forced departure from such initial state or condition. Most commonly, aerodynamic static stability is operatively associated with the tendency of the aircraft to return, for example, to an initial angle of attack, angle of sideslip, or roll angle, subsequent to or following the occurrence of a particular disturbance.

The maneuvering capability of, for example, a fighter type aircraft is optimized if substantially neutral static stability is achieved and maintained. Excessive stability severely restricts the maneuvering capability of the aircraft, while excessive instability is highly undesirable in view of the fact that a highly-sensitive, fast-acting, and powerful automatic stability system must be provided for the aircraft and maintained functional at all times. Therefore, in order to cruise or maneuver most efficiently, an aircraft should be designed so that when trimmed, both the wings and the trimming surfaces are developing lift opposite in directional sense or orientation relative to the intended or impressed g loads such that the developed total lift, divided by the total drag, is a maximum. The wing-body or wing-fuselage assemblage, for example, should be designed to be substantially neutrally stable such that when experiencing both high and low load factors, the trimming aerodynamic surface is lightly loaded. In part, and in other words, there is reduced trim drag. This substantially neutral stability state can in fact be approximately achieved with current technology with respect to one particular flight condition and Mach number. It must also be appreciated at this juncture that the aircraft exhibits, or has operatively associated therewith, two different static stability components or characteristics. One of these static stability components or characteristics is lateraldirectional stability which operates about the roll and yaw axes, and the other static stability component or characteristic is longitudinal stability which operates about the pitch axis.

The problem now becomes quite apparent that with current technology, it is extremely difficult to design an aircraft that can in fact maneuver efficiently, that is, with a minimum amount of drag, throughout both the subsonic and high supersonic speed ranges, as well as within the transonic region. The reason for this is due to the drastically different pressure distributions or characteristics impressed upon the aircraft wings and control surfaces, fins, and stabilizers during the subsonic and supersonic speed regimes. Similar differences occur with respect to directional static stability as the aircraft experiences differing degrees of angle of attack.

A natural physical phenomenon of transonic aerodynamics, for example, is that longitudinal static stability increases with increasing Mach number, while directional static stability decreases with increasing supersonic Mach number. Similarly, directional static stability decreases with increasing angles of attack. The reasons for these phenomena are, for example, with respect to the change in the longitudinal stability of the aircraft, as the aircraft transcends or traverses the speed ranges from subsonic, through transonic, and into the supersonic ranges, the aerodynamic center shifts rearwardly from a position approximately 25% of the mean aerodynamic chord to one approximately 50% of the mean aerodynamic chord. This is due to the change in the pressure distribution over the aircraft airfoils from one having a substantially sharp pressure peak at the 25% mean aerodynamic chord position to a substantially uniform distribution over the airfoil.

With respect to the change in the directional static stability of the aircraft, the directional static stability of the aircraft is of course directly related to or dependent upon the lift curve slope of the vertical fin. It is well known that this slope changes with Mach number, and in fact peaks at Mach 1 and thereafter drastically drops off or sharply declines toward zero as the Mach number increases toward Mach 2 or beyond.

Similarly, with respect to the change in the directional static stability of the aircraft with increasing angle of attack, the vertical tail fin is normally disposed at a vertical location above the wing plane including the leading edge of the wing, and during normal, level cruise flight, this air region exhibits high energy air flow. Directional static stability is therefore high due to the interaction defined between the vertical fin/rudder and this high energy air flow. During high angles of attack, however, the vertical fin and rudder will be disposed below the normal wing plane as defined by the wing leading edge, and the energy of the air flow around the wing during such angles of attack has been substantially reduced due to the turbulent air flow conditions which prevail within the airfoil region when the airfoil is disposed at such angle of attack values. Consequently, the vertical fin and rudder cannot be as effective within such low energy air flow regions in order to impart to the aircraft the requisite directional static stability.

In view of the foregoing, it will therefore be readily appreciated that if an aircraft is designed to cruise and maneuver efficiently at subsonic speeds by being substantially neutrally longitudinally stable, then at supersonic speeds the aircraft will exhibit excessive longitudinal stability and will not be able to be maneuvered efficiently. Similarly, if the aircraft is designed to maneuver and cruise efficiently at supersonic speeds from a directional static stability point of view, then at subsonic speeds the aircraft will exhibit excessive directional static stability and will not be capable of efficient maneuverability.

In order to therefore practically accommodate the aforenoted incompatible flight characteristics of the particular aircraft which will transcend or traverse the subsonic, transonic, and supersonic speed ranges, several modes of design operations or practices have been currently instituted. For example, in order to accommodate the changes in longitudinal static stability of the aircraft with increasing Mach number, the aircraft has been specially designed with respect to the most important speed range for that aircraft and its designated missions, and the resulting penalties in performance and/or handling qualities or characteristics within the speed regions or regimes outside of the designed speed range must simply be tolerated. This means or mode of designing the aircraft and operating the same in light thereof is not at all ideal although such has been a conventionally acceptable solution to the stability and handling problems characteristic of supersonic aircraft. Another mode of operational design for supersonic aircraft in accommodating the changes in the longitudinal static stability of the aircraft with increasing Mach number is to design the particular aircraft such that the disposition or location of the center of gravity of the craft renders the aircraft slightly stable at supersonic speeds, the craft being capable of being efficiently trimmed and controlled. At subsonic speeds, the aircraft will be aerodynamically unstable. This condition or state is also not particularly desirable in view of the fact that an active control system is therefore required to impart the necessary stability to the aircraft. Such a system adds weight to the aircraft, and also adds a critical active element to the craft with the attendant risk of aircraft destruction should the control system experience failure.

A further current or conventional mode of operational design in conjunction with supersonic aircraft for accommodating the varying longitudinal static stability characteristics of the subsonic and supersonic speed regimes comprises the in-flight shifting of a substantially easily translatable massive entity within the aircraft, such as, for example, the fuel load or the like. The operational drawback or disadvantage with this type of stability design scheme resides in the fact that auxiliary apparatus must be provided for accomplishing the shifting of the massive entity, and therefore, the center of gravity of the aircraft. This apparatus adds considerable additional weight to the aircraft. In addition, such an operational scheme is not in fact desirable in view of the requirement that fighter aircraft frequently have to transcend or traverse the transonic speed range during the course of combat in an extremely rapid fashion. In a similar manner, in-flight variation of the wing geometry is also not particularly desirable in view of the requirement for massive actuators and increased structural weight attendant the movement of the wing structures. Fixed-geometry wing structures exhibiting highly swept, low aspect ratio characteristics and relatively small changes or variations in longitudinal stability at transonic speeds are likewise undesirable as such wings do not exhibit efficient stability characteristics at subsonic speeds.

A current or conventional mode of operational design for supersonic aircraft in order to accommodate the changes in the directional static stability of the aircraft as the craft transcends or traverses the subsonic, transonic, and supersonic speed ranges is to provide the aircraft with a vertical fin which has a geometrical size substantially greater than otherwise conventional subsonic aircraft vertical fins. In this manner, the directional static stability requirements for high supersonic speed flight are satisfied, however, the aircraft experiences excessive directional static stability during subsonic flight conditions. Alternatively, a smaller vertical fin can be employed for providing efficient directional static stability during subsonic flight conditions, however, an automatic stability system which controls the vertical tail fin or rudder as a function of sideslip is required.

Lastly, a current or conventional mode of operational design for supersonic aircraft in order to accommodate the large pitch down moment associated with vectored thrust in STOL operations is to provide the aircraft with an additional trim thrust device disposed forwardly of the center of gravity of the aircraft, and/or provide the aircraft with large and powerful aerodynamic control surfaces.

A need therefore exists for aircraft structure which can be incorporated into the structural systems or designs of supersonic aircraft so as to satisfy the various conflicting longitudinal and directional static stability requirements of the aircraft as the aircraft undergoes or experiences subsonic, transonic, and supersonic flight conditions, as well as varying degrees of angle of attack.

Accordingly, it is an object of the present invention to provide a new and improved aircraft structure which overcomes the aforenoted operational design disadvantages and drawbacks characteristic of conventional aircraft structure and structural systems.

Another object of the present invention is to provide a new and improved aircraft structure which is embodied within a new and improved empennage assembly.

Still another object of the present invention is to provide a new and improved empennage assembly for supersonic aircraft.

Yet another object of the present invention is to provide a new and improved empennage assembly for supersonic aircraft which will substantially improve the aerodynamic static stability of the aircraft throughout the subsonic, transonic, and high supersonic speed regimes and which can function as conventional pitch, yaw and roll controls.

Still yet another object of the present invention is to provide a new and improved empennage assembly for supersonic aircraft which will substantially improve the aerodynamic longitudinal and directional static stability components of the aircraft throughout the subsonic, transonic, and high supersonic speed regimes.

Yet still another object of the present invention is to provide a new and improved empennage assembly for supersonic aircraft which will substantially improve the aerodynamic static stability of the aircraft throughout the subsonic, transonic, and high supersonic speed regimes by rendering the aerodynamic longitudinal and directional static stability components of the aircraft substantially constant at an optimum low level of stability throughout the subsonic, transonic, and high supersonic speed ranges.

A further object of the present invention is to provide a new and improved empennage assembly for supersonic aircraft which substantially improves the maneuverability efficiency of the aircraft throughout the subsonic, transonic, and high supersonic speed ranges.

A still further object of the present invention is to provide a new and improved empennage assembly for supersonic aircraft which substantially improves the maneuverability capability and efficiency of the aircraft throughout the subsonic, transonic, and high supersonic speed regimes by rendering the aerodynamic static stability of the aircraft substantially constant independent of Mach number.

A yet further object of the present invention is to provide a new and improved empennage assembly for supersonic aircraft wherein the empennage assembly is of the caster type rotatable about a longitudinal axis disposed substantially parallel to the longitudinal axis of the aircraft.

A still yet further object of the present invention is to provide a new and improved empennage assembly for supersonic aircraft wherein the empennage assembly is of the caster type, comprising two tail surfaces of substantially different size, aspect ratio, sweep, and taper ratio, rotatable about a longitudinal axis disposed substantially parallel to the longitudinal axis of the aircraft so as to effectively interchange the angular orientation of the tail surfaces and thereby maximize the aerodynamic static stability characteristics of the aircraft throughout the subsonic, transonic, and high supersonic speed regimes.

A yet still further object of the present invention is to provide a new and improved empennage assembly for supersonic aircraft wherein the empennage assembly is of the rotatable caster type such that the angular orientation of the empennage is automatically achieved as a function of Mach number so as to maximize the aerodynamic static stability characteristics of the aircraft throughout the subsonic, transonic, and supersonic speed ranges.

An additional object of the present invention is to provide a new and improved empennage assembly for supersonic aircraft wherein the empennage assembly is of the rotatable caster type such that the angular orientation of the empennage can be varied in order to maximize the aerodynamic static stability efficiency characteristics of the aircraft depending upon, or as a function of, the varying degrees of angles of attack of the aircraft.

A still additional object of the present invention is to provide a new and improved empennage assembly for supersonic aircraft wherein the empennage assembly is of the rotatable caster type such that the angular orientation of the empennage can be varied in order to use wing downwash to help trim the pitching moments associated with vectored thrust, such as, for example, during STOL operations.

DISCLOSURE OF THE INVENTION

The foregoing and other objectives of the present invention are achieved through the provision of a caster type empennage assembly for the aircraft wherein the assembly comprises two mutually perpendicular tail surfaces of different geometry, size, aspect ratio, sweep, and taper ratio. For convenience of description, references to the two tail surfaces will be limited to their differences in size only, however, it is to always be appreciated that the particular tail surfaces of the present invention are in fact different from each other in their aspect ratio, sweep, taper ratio, and the like.

The two tail surfaces are mounted upon longitudinally extending booms which may be disposed or located relative to the wing and fuselage components of the aircraft within various modes. In particular, the booms may be mounted upon the wing tips or they may be mounted upon inboard trailing edge portions of the wings. The tail surfaces of the present invention may be employed alone, that is, they would comprise the sole horizontal stabilizers and vertical fins, or may be utilized in conjunction with conventional stabilizer and fin structure. Still further, the tail surfaces of the present invention may be utilized in conjunction with canard control surfaces. As an additional alternative, in lieu of a caster type empennage being operatively associated with each wing of the aircraft, a single central boom may be mounted upon the aft portion of the aircraft fuselage to which, in turn, a single caster type empennage may be mounted.

Regardless of the particular configuration or alternative embodiment of the empennage mounting system employed upon a particular aircraft for achieving a specific design in satisfaction of particular mission requirements designated for the particular aircraft, the empennage assembly comprising the two mutually perpendicular, different sized tail surfaces is mounted upon an aft section of the single or plural booms such that the entire empennage assembly is rotatable about the longitudinal axis of the boom with which it is operatively associated. As viewed from a vantage point rearward of the boom, and therefore viewing the empennage system substantially along the boom axis, the empennage system of the present invention has a substantially L-shaped configuration. Dependent upon the particular angular rotation or orientation of the smaller and larger tail surfaces of the empennage assembly, the larger and smaller tail surfaces may either be vertically or horizontally oriented either upwardly or downwardly, or inboard or outboard, respectively, relative to the aircraft.

It is well known that when a tail surface is disposed parallel to the wing plane, that is, horizontally, the contribution of such tail surface to longitudinal static stability for the aircraft is maximized while the contribution of such tail surface to directional static stability of the aircraft is substantially zero. Conversely, when a tail surface is disposed perpendicular to the wing plane, that is, vertically, the contribution of such tail surface to directional static stability is maximized while the contribution of such tail surface to longitudinal static stability of the aircraft is substantially zero. Consequently, it will readily be appreciated that the contribution of each of the tail surfaces of the empennage system of the present invention to the directional and longitudinal static stability components of the aircraft can be selectively or predeterminedly varied as a function of the angular orientation or rotation of the boom upon which the empennage system is mounted.

In accordance then with the present invention, the booms are angularly oriented or rotated by automatic control means which monitors the speed of the aircraft and determines the Mach number characteristic thereof such that the angular orientation of the empennage system is automatically varied as a function of the Mach number. In this manner, the input or contribution of each tail surface to the longitudinal and directional static stability components of the aircraft are varied in order to counteract the stability changes which naturally occur as the aircraft transcends or traverses the subsonic, transonic, and supersonic speed regimes. In particular, therefore, during subsonic flight conditions, when the longitudinal static stability is normally low or substantially less than that during supersonic flight conditions, while the directional static stability is normally high or substantially greater than that during supersonic flight conditions, the empennage system of the present invention is angularly oriented such that the larger tail surface is disposed horizontally and the smaller tail surface is disposed vertically. In this manner, the input or contribution of the horizontal tail surface to the longitudinal static stability of the aircraft is maximized while the input or contribution of the vertical tail surface to the directional static stability is minimized. Alternatively, during supersonic flight conditions, the booms and the associated empennage systems are rotated such that the larger tail surface is now disposed within the vertical plane while the smaller tail surface is disposed within the horizontal plane. In this manner, the input or contribution of the larger tail surface to directional static stability is now maximized while the input or contribution of the smaller tail surface to longitudinal static stability is now minimized. The booms and their associated empennage may also of course be angularly oriented to intermediate positions between the 90° interchange or exchange orientations of the two larger and smaller tail surfaces so as to always maintain the static stability of the aircraft substantially constant throughout the subsonic, transonic, and supersonic speed regimes.

It is lastly to be noted at this juncture that while other particular orientations of the larger and smaller tail surfaces are possible, as will become more fully apparent hereinafter, in accordance with the present invention and its concomitant mode of operation, during subsonic flight conditions, for example, the smaller tail surface will normally be disposed in its illustrated orientation so as to be disposed vertically upwardly, while the larger tail surface will be disposed horizontally outwardly. As the booms are angularly rotated from their subsonic orientations toward their supersonic orientations, the smaller tail surface component or member will now be disposed within a horizontally outboard disposition while the larger tail surface component or member will be disposed within a vertically downward disposition. It has also been found that this vertically downward disposition of the larger tail surface during supersonic flight conditions can likewise be employed for enhancing the directional static stability of the aircraft during large angles of attack modes of the aircraft regardless of whether the aircraft is operating under supersonic flight conditions. The reason for this resides in the fact that at high angles of attack, the region of the air flow disposed above the wing is a low energy air flow region while the region of air flow disposed below the wing is a high energy air flow region. The particular disposition of the larger tail surface member in its vertically downward orientation therefore enables such tail surface member to fluidically interact with the high energy air flow region defined below the wing plane and thereby impart high directional static stability to the aircraft which counteracts the normally deteriorated directional static stability of the aircraft when the same is disposed within a high angle of attack mode.

It has still further been observed that during STOL operations, which of course normally occur only under subsonic flight conditions, various angular orientations of the larger and smaller tail surface components can advantageously affect the lift and trim characteristics of the STOL aircraft. For example, the larger surface component can be oriented either vertically upwardly or downwardly, while the smaller tail surface component or member can be oriented horizontally inboard or outboard of the aircraft. While this basic or generic orientation of the surfaces for STOL operation during subsonic flight conditions is generally considered to be opposite that, or 90° out of phase with, the normal subsonic flight conditions orientation of the empennage, a performance trade-off is experienced wherein it is more, or primarily, desirable to achieve the increased lift characteristics for the aircraft during the STOL operations. Alternatively, depending upon the particular type of aircraft upon which, or in conjunction with, the caster type empennage system of the present invention is being employed, that is, whether a single central boom and empennage is being employed, or dual booms and empennage systems are being employed with either wingtip or inboard wing trailing edge mounting of the booms and empennage systems, various other angular orientations of the tail surfaces may be desired to achieve the particular lift and trim characteristics of the STOL aircraft. For example, for wing-tip mounted booms and associated empennage, the larger tail surface components or members may be disposed horizontally inboard while the smaller tail surface members may be disposed vertically downward. In this manner, the larger tail surfaces may advantageously fluidically interact with the inboard wing downwash field aft of the wing surfaces. This will cause a forward shift of the aerodynamic center of the aircraft whereby the trim requirements may be reduced and an increase in the vectored thrust angle and moment will be facilitated. It is noted that this orientation of the larger tail surface component is opposite that of normal subsonic flight conditions wherein the larger tail surface component is disposed horizontally outboard of the aircraft so as to fluidically interact with the upwash field generated within the aircraft wing tip regions.

Lastly in connection with STOL operations, it is also to be noted that it is generally desirable to have, if possible, either the larger or smaller tail surface component of the empennage oriented vertically downwardly in order to take advantage of the high-energy flow region below the wing plane in view of the fact that during STOL operations, the aircraft will be disposed within a relatively high angle of attack mode. Sometimes, however, the particular design of the aircraft is such that the vertically downward orientation of one of the tail surface components, particularly the larger component, is not feasible in that adequate ground clearance for the aircraft is not able to be achieved. In this instance, the booms and their associated empennage may either be reoriented through means of 90° angular orientation or rotation steps, or alternatively, the booms and empennage may be rotated to intermediate angular positions or orientations.

BRIEF DESCRIPTION OF THE DRAWINGS:

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

BEST MODE FOR CARRYING OUT THE INVENTION

Figure 1A:
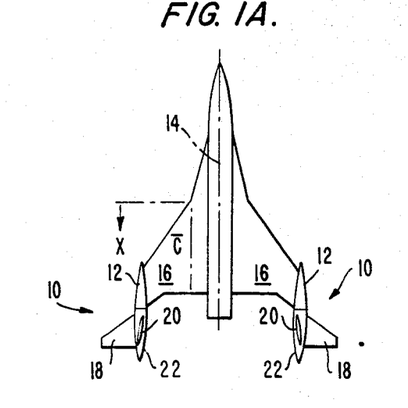
FIG. 1A is a plan view of a supersonic aircraft equipped with the new and improved caster type empennage assembly of the present invention and showing the empennage system disposed within its low subsonic orientation.

Referring now to the drawings, and more particularly to FIG. 1A thereof, there is disclosed a supersonic aircraft which is equipped with the new and improved empennage system of the present invention which is generally indicated by the reference character 10. The empennage system for this particular type of aircraft is seen to actually comprise two systems 10—10, and it is appreciated that each empennage system 10 comprises a longitudinally, rearwardly extending boom structure 12 disposed substantially parallel to the longitudinal axis 14 of the aircraft. The booms 12 are secured to the tip portions of the aircraft wings 16, and the empennage systems 10 further comprise a first tail surface component 18 and a second tail surface component 20, the components being disposed mutually perpendicular with respect to each other. The booms 12 are divided into substantially two half sections, the forward section of which is securely fastened to its associated wing tip, while the aft half section is rotatably mounted upon the wing tip-forward boom half section assemblage. The first and second tail surface components 18 and 20 of the empennage assemblies 10 are mounted upon the aft rotatable boom sections 22, and in this manner, the empennage tail surfaces 18 and 20 are angularly rotatable about the longitudinal axes of the booms 12 and relative to the aircraft so as to in fact define the caster type empennage system for supersonic aircraft characteristic of the present invention.

Figure 4:
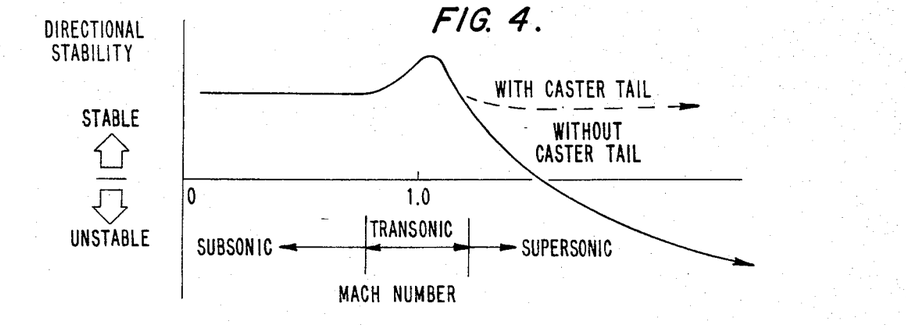
FIG. 4 is a graph similar to that of FIG. 3 illustrating the changes in directional static stability of the aircraft as a function of Mach number for aircraft equipped with the empennage system of the present invention as compared to aircraft provided with conventional empennage assemblies.
Figure 5:
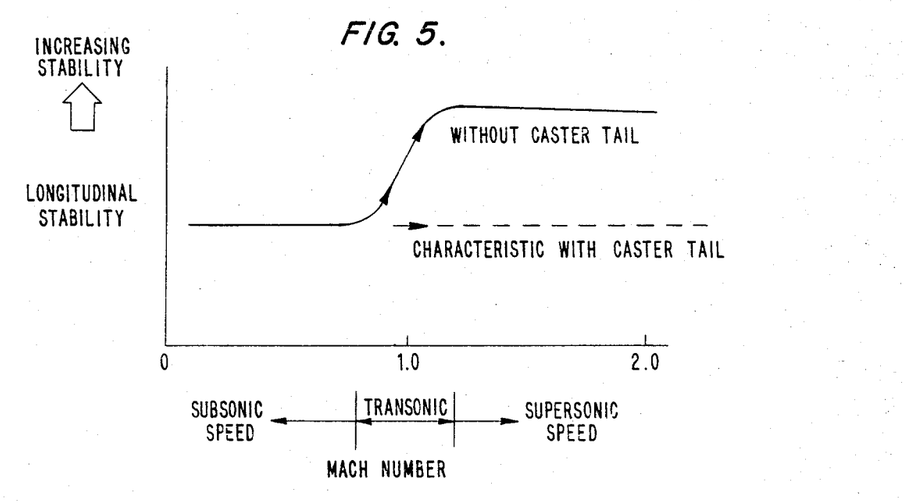
FIG. 5 is a graph similar to that of FIG. 4 illustrating the changes in longitudinal static stability of the aircraft as a function of Mach number for aircraft provided with the empennage system of the present invention as compared to aircraft provided with conventional empennage assemblies.

As is well known, and as has been noted hereinbefore, as a supersonic aircraft transcends or traverses the subsonic, transonic, and supersonic speed ranges, the directional and longitudinal static stability components of the aircraft's aerodynamic static stability will change. The directional static stability of the aircraft will also change, regardless of speed or Mach number, as a function of the angle of attack of the aircraft, and these natural phenomena characteristic of supersonic aircraft, and aircraft in general respectively, are graphically illustrated in FIGS. 4-6. To briefly reiterate, the directional static stability of the aircraft drastically decreases with increasing Mach number beyond the transonic speed range due to the characteristics of the lift curve slope of the vertical fin. Longitudinal static stability increases substantially beyond the transonic speed range in view of the longitudinal rearward shifting of the aerodynamic center or center of pressure of the aircraft with increasing Mach number. Similarly, the directional static stability of the aircraft deteriorates drastically with increasing angle of attack in view of the difference in the fluidic interaction of the vertical fin and rudder with the high energy and low energy air flow regions of the aircraft during low and high angle of attack regimes, respectively.

It has also been noted hereinbefore that the maneuverability efficiency of a fighter aircraft, for example, is best achieved or maximized when the aircraft is provided with, or characterized by, a substantially constant and optimum level of static stability throughout the different speed regimes. This substantially constant and near neutral static stability can therefore be achieved and maintained if the rapid deterioration in the directional static stability with increasing Mach number or angle of attack were prevented or counteracted by increasing the directional static stability under such otherwise deteriorating conditions, and similarly, if the increase in longitudinal static stability with increasing Mach number was prevented or counteracted by decreasing such stability component with increasing Mach number. It will be recalled that the contribution of tail surfaces to directional and longitudinal static stability components or values is dependent upon whether or not the particular tail surface is disposed within the vertical or horizontal planes, respectively, that is, perpendicular to, or parallel with, the wing planes.

In accordance then with the present invention, the caster type empennage system 10 comprises the first and second tail surfaces 18 and 20, respectively, and it is seen that the first surface 18 is, for example, substantially larger in size than that of the second surface 20. The two tail surfaces may also differ in their overall geometry, aspect ratio, taper ratio, sweep, and like characteristics, however, in order to simplify the disclosure and operation of the present invention, the basic difference between the tail surfaces that will be referred to is their relative size. Consequently, when it is desired to increase or decrease the particular directional or longitudinal static stability value of the aircraft as a function of Mach number or angle of attack, the contribution of the particular tail surface or surfaces to such directional or longitudinal static stability values may be varied by exchanging or interchanging the relative dispositions of the larger and smaller tail surfaces within the vertical and horizontal planes.

Figure 1B:
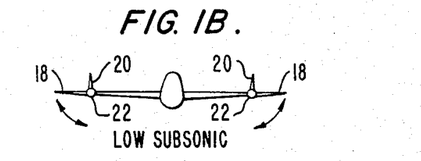
FIG. 1B is a rear elevation view of the aircraft of FIG. 1A showing the empennage system of the present invention disposed within its low subsonic orientation.
Figure 1C:
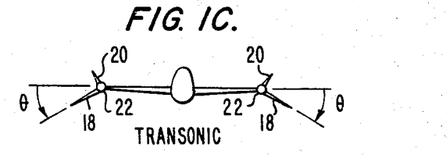
FIG. 1C is a partially schematic, rear elevation view of the aircraft of FIG. 1A showing the empennage system of the present invention angularly rotated or oriented to its transonic mode or orientation.
Figure 1D:
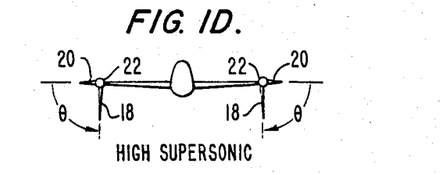
FIG. 1D is a view similar to that of FIG. 1C, showing however the further angular rotation of the empennage system of the present invention to its high supersonic mode or orientation.

Referring then to FIGS. 1B, 1C, and 1D, it is seen that under subsonic flight conditions, the larger tail surface member 18 of each empennage system 10 will be disposed within the horizontal or wing plane while the smaller tail surface member 20 of each empennage system 10 will be disposed within the vertical plane perpendicular to the wing plane, with each member 20 disposed vertically upwardly. To appreciate the empennage system of the present invention, we can consider now the extreme conditions of high supersonic flight wherein the directional static stability would normally decrease sharply with increasing Mach number while the longitudinal static stability would normally be increased. Considering, however, FIGS. 1D, 4, and 5, it is seen that in accordance with the present invention, each of the empennage assemblies has been rotated or angularly oriented through an angular displacement $\theta$, as measured downwardly and inboard of the aircraft from the wing plane, of 90°. Due to the fact that the larger tail surface components or members 18 are now disposed within the vertical planes, their contribution to the directional static stability of the aircraft has increased relative to that characteristic of subsonic flight conditions as determined by the smaller tail surfaces 20, while the smaller tail surfaces 20 are now disposed within the horizontal or wing planes such that their contributions to the longidutindal static stability of the aircraft has decreased relative to that characteristic of subsonic flight conditions as determined by the larger tail surfaces 18. As a result of these operations and re-orientations of the empennage systems, the directional and longitudinal static stability values for the aircraft remain substantially constant throughout the subsonic and supersonic speed regimes as may be graphically appreciated from FIGS. 4 and 5 wherein the stability values or levels are compared for aircraft equipped with the caster type empennage system of the present invention and conventional aircraft without such empennage systems.

Figure 2:
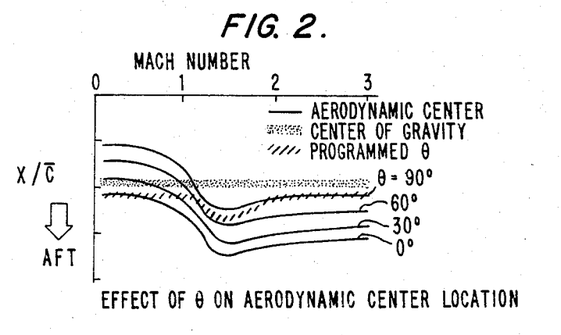
FIG. 2 is a graph illustrating the longitudinal shift in the aerodynamic center of the aircraft relative to the center of gravity of the aircraft as a function of the angular rotation or orientation of the empennage system of the present invention and Mach number.
Figure 3:
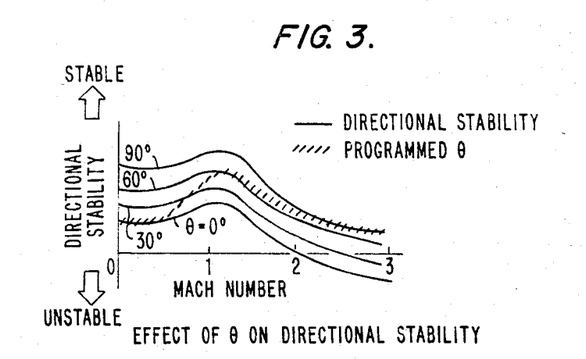
FIG. 3 is a graph illustrating the changes in directional static stability of the aircraft as a function of the angular rotation or orientation of the empennage system of the present invention and Mach number.

As may be additionally appreciated from consideration of FIG. 1C, the empennage systems 10 may be angularly rotated to intermediate $\theta$ values during the transonic speed range, and the value of $\theta$ is smoothly varied as a function of Mach number as determined by means of appropriate electronic feed-back control means 23 for sensing, for example, the aircraft Mach number and controlling the empennage systems in response thereto. The effects of the angular rotation or re-orientation of the empennage systems 10 upon the directional static stability and the longitudinal static stability, the latter of which is a function of, or dependent upon, the location of the aerodynamic center of the aircraft, can be appreciated from FIGS. 3 and 2. As the automatically programmed changes in $\theta$ are accomplished by means of the feed-back control circuitry in response to sensed changes in Mach number, the directional static stability is rendered substantially constant. In addition, the location of the aerodynamic center of the aircraft, relative to the center of gravity of the aircraft, is rendered substantially constant by, in effect, moving the aerodynamic center forwardly with increasing $\theta$ values. The reason for this is that the aerodynamic center of the aircraft is determined in part by the aerodynamic center of the wings and horizontal stabilizers. By decreasing the effective size of the horizontal stabilizers with increasing Mach numbers and $\theta$ values, the composite aerodynamic center is gradually moved toward the wings in view of the fact that the wings now comprise substantially most of the composite input factor or value to the aircraft aerodynamic center. As seen from FIGS. 1A and 2, the longitudinal position of the aerodynamic center of the aircraft is determined by the ratio $x/\bar{c}$ wherein $\bar{c}$ is the length of the mean aerodynamic chord, while x is the distance of the aerodynamic center to the leading edge of the mean aerodynamic chord.

It is to be noted from FIGS. 1A-1D that the particular disclosed embodiment of the aircraft mounting of the empennage systems 10 of the present invention upon the wing tips such that the horizontal tail surfaces are disposed rearwardly and outboard of the wings 16, as determined by means of the longitudinally, rearwardly extending booms 12, is particularly aerodynamically advantageous in view of the fact that the horizontal surface fluidically interacts with the strong upwash field emanating from the lifting wing 16 operatively associated therewith. A lifting wing, of course, generates a flow field in its wake which is characterized by means of a downwash flow aft of the inboard wing sections and an upwash flow region aft of the outboard wing sections and wing tips. This upwash flow region is beneficial for longitudinal static stability in view of the fact that a tail surface disposed within the upwash field will generate approximately three times more longitudinal static stability per square foot of area than when mounted within the downwash field. It is thus apparent that changes in the size and geometry of a horizontal tail surface within the upwash field has large effects upon the longitudinal stability of the aircraft. These effects are also somewhat amplified still further in view of the additional fact that the empennage systems of the present invention are mounted upon the booms 12 which effectively define moment arms for the empennage tail surfaces. This disposition of the tail surfaces upon the elongated booms and within the particular upwash and downwash flow regions of the aircraft differentiate the system of the present invention from a system similar to that shown in U.S. Pat. No. 4,247,062 issued to Brueckner wherein the system is mounted upon variable geometry wing sections and therefore cannot take advantage of the downwash and upwash flow regions aft of the lifting wings.

Figure 6:
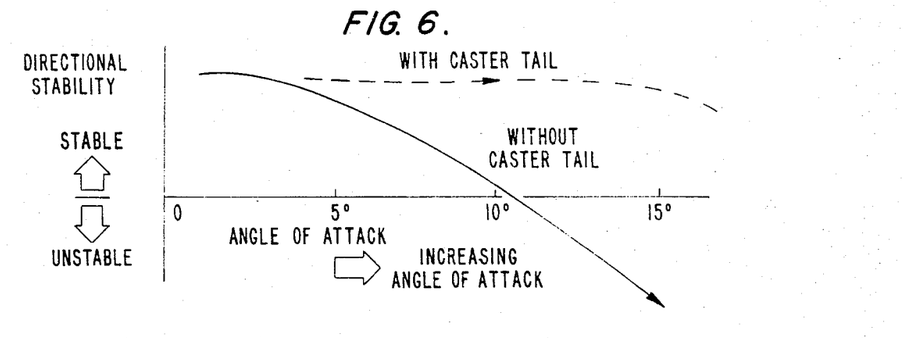
FIG. 6 is a graph similar to that of FIG. 4 illustrating the changes in directional static stability of the aircraft as a function of angle of attack for aircraft provided with the empennage system of the present invention as compared to aircraft equipped with conventional empennage assemblies.

Considering the employment of the empennage systems 10 of the present invention in order to impart increased directional stability for the aircraft under high angle of attack operational modes, it is seen from FIG. 6 that directional stability normally deteriorates with increasing angle of attack. However, with the present inventive empennage system, if the empennage tail surfaces and system are angularly rotated to the position corresponding to that of the supersonic mode shown in FIG. 1D, then the directional static stability will be increased and rendered substantially constant for all angle of attack modes. This is particularly true in the case of increasing angles of attack, or high degrees of angle of attack, in view of the fact that the vertically downward disposition of the larger tail surface 18 effectively encounters and fluidically interacts with the high energy air flow region defined beneath the high angle of attack wing so as to in fact impart a high degree of directional stability to the aircraft.

Figure 7:
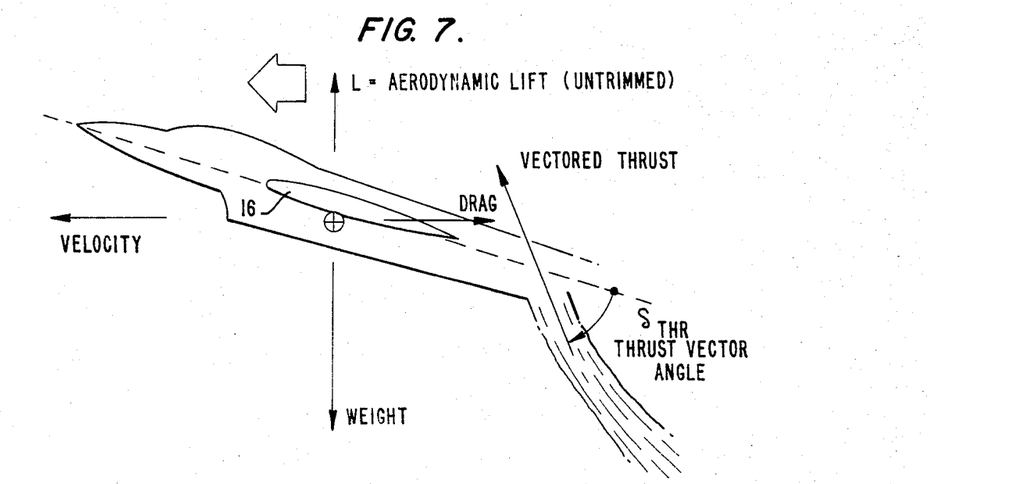
FIG. 7 is a schematic view of a vectored thrust aircraft illustrating in the form of an untrimmed force diagram the various forces and moments acting upon the aircraft during STOL operations.
Figure 8A:
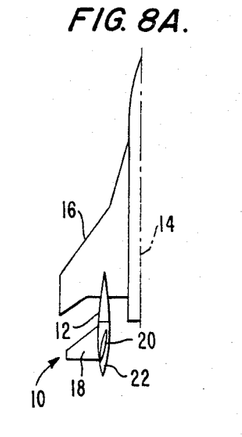
FIGS. 8A and 8B, 9A and 9B, 10A and 10B, and 11A and 11B, are views similar to those of FIGS. 1A and 1C, respectively, showing however the equipment of various different types of aircraft with the empennage system of the present invention also disposed at various positions upon the aircraft.
Figure 8B:
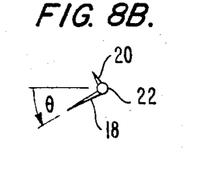

The aforenoted angular orientation of the empennage system for high angle of attack modes may also be utilized in conjunction with STOL (short take-off and landing) aircraft capabilities that employ vectored thrust as seen in FIG. 7. In this mode, therefore, directional static stability of the aircraft is enhanced and longitudinal static stability of the aircraft is reduced. As STOL operations are normally performed under subsonic flight conditions, this angular orientation of the empennage systems 10 is opposite that normally required or desired during subsonic flight conditions. However, as is apparent from FIG. 7, a force and moment balance is required for equilibrium during STOL operations, and it is apparent that if the aerodynamic lift vector L can be moved forward, the trim requirements can be reduced, or in other words, the thrust angle $\delta_{THR}$ can be increased thereby resulting in increased total lift when the aircraft is properly trimmed. The increased lift capability can in turn be used to either increase the landing and take-off weight of the aircraft at a predetermined speed, or alternatively, can decrease the landing and takeoff speed, and associated ground roll, for a predetermined aircraft weight. Consequently, a trade-off in performance under subsonic conditions is made in favor of the primary mission requirements of the vectored STOL aircraft.

Alternatively with respect to STOL operations, it is also possible to orient the empennage systems 10 such that the larger tail surfaces 18 are disposed horizontally inboard of the aircraft and the smaller tail surfaces 20 disposed vertically downwardly. This angular orientation of the empennage systems 10 is therefore seen to be 180° out of phase with the normal subsonic mode of operation of the empennage system as seen from FIG. 1B. However, it is to be appreciated that the larger tail surfaces 18 are now disposed within the downwash flow fields or regions aft of the inboard wing sections, and the smaller tail surfaces are still disposed beneath the wing planes so as to provide the requisite directional static stability to the aircraft. Consequently, the aforenoted lift and directional static stability characteristics of the STOL aircraft can still be achieved. In addition, with the smaller tail surfaces 20 disposed vertically downwardly, additional ground clearance is provided for the aircraft. If still additional ground clearance for the aircraft is required, the empennage systems 10 can be angularly re-oriented to some intermediate $\theta$ value which will impart the requisite STOL operating characteristics to the aircraft while simultaneously providing the necessary ground clearance.

Figure 9A:
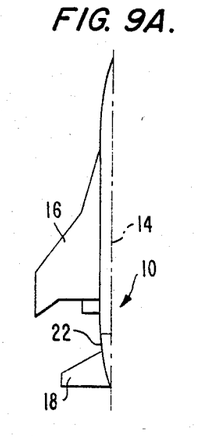
Figures 9B, 10B:
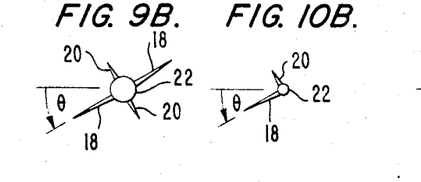
Figures 10A, 11A:
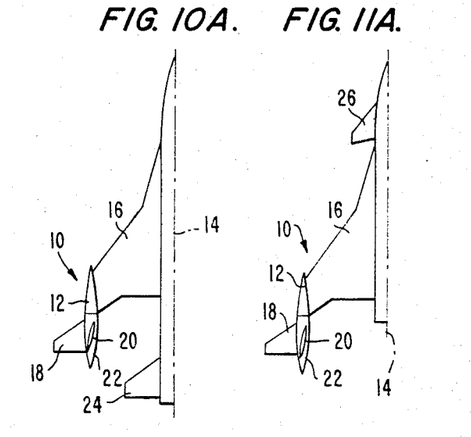
Figure 11B:
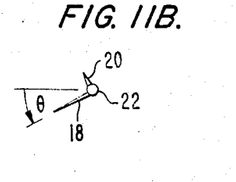

Referring lastly to FIGS. 8A–8B, 9A–9B, 10A–10B, and 11A–11B, there is disclosed various other types of aircraft relative to the aircraft exemplified within FIG. 1A, upon which the empennage system of the present invention may be employed. Similarly, as disclosed in FIGS. 8A and 8B, the aircraft disclosed therein is the same as that disclosed within FIG. 1A, however, it is noted that the booms 12, only one of which is shown, are mounted upon the inboard, trailing edge portions of the wings as opposed to the wing-tip mounting system disclosed in FIG. 1A. In FIGS. 9A and 9B, in lieu of two booms 12 and two empennage systems 10 as employed within the aircraft of FIG. 1A, the aircraft of FIGS. 9A and 9B is provided with a single central boom, having its rotatable section 22, extending longitudinally rearwardly of the fuselage. It is also noted that with this particular embodiment of the empennage system of the present invention, two sets of larger tail surfaces 18 and smaller tail surfaces 20 are employed. In the embodiment of FIGS. 10A and 10B, the aircraft, and the disposition of the empennage systems upon the aircraft, are the same as those disclosed in FIG. 1A, however, the aircraft is additionally provided with conventional horizontal stabilizer means 24. Similarly, the aircraft of FIGS. 11A and 11B is similar to that of FIG. 1A, and the mounting arrangement of the empennage system 10 is likewise the same, however, the aircraft is additionally provided with a canard surface 26.

Thus it may be seen that the empennage system of the present invention has important advantages over conventional systems in that the empennage system of the present invention imparts to supersonic aircraft an optimized, substantially neutral and constant aerodynamic static stability throughout the subsonic, transonic, and high supersonic speed regimes such that the maneuvering capabilities of the aircraft are maximized throughout such flight regimes. The system of the present invention thus rectifies the conflicting directional and longitudinal stability requirements of the aircraft throughout the speed ranges by varying the empennage orientation and operational geometry as a function of Mach number. The empennage system also advantageously affects the directional stability of the aircraft during high angle of attack operational modes as well as the required longitudinal stability during STOL operations of aircraft employing vectored thrust. In connection with the varied angle of attack modes, the directional stability of the aircraft is able to be maintained substantially constant with the empennage system of the present invention for angles of attack within the range of 0°–15° after which the directional stability of the aircraft tends to deteriorate, instability of the aircraft actually occurring at approximately 25°–40° of angle of attack. The electronic feed-back control means 23 also automatically programs the orientation of the empennage as a function of the angle of attack of the aircraft in a manner similar to that employed for sensing Mach number and controlling the empennage accordingly. It is to be noted that sometimes, such as, for example, during subsonic, high angle of attack modes, a performance trade-off is again going to be required as in the case of STOL operations, and the Mach number and angle of attack feedback control means may have to be properly coordinated and given priority of control over the empennage depending upon the particular design of the aircraft and the designated missions. Alternatively, an operational rectification of the conflicting requirements or parameters of high angle of attack and subsonic flight conditions can be achieved by disposing the larger tail surface horizontally inboard of the aircraft, for an aircraft of the type shown in FIG. 1A, while the smaller tail surface is disposed vertically downwardly. In this manner, similar to one of the aforenoted operational dispositions of the tail surfaces during STOL operations, the subsonic longitudinal stability is preserved while the directional stability is still somewhat increased as compared to conventional empennage in view of the fact that a vertical fin is in fact disposed beneath the wing plane for fluidic interaction with the high energy air flow region below the wing plane.

Obviously, many modifications and variations of the present invention are possible in light of the above teachings. It is therefore to be understood that within the scope of the appended claims, the present invention may be practiced otherwise than as specifically described herein.

I claim:
1. An empennage assembly for aircraft, comprising:
 a fuselage;
 wing means secured to said fuselage for defining therewith an aerodynamic center;

empennage means, including a vertical stabilizer having an aerodynamic center, and a horizontal stabilizer having an aerodynamic center; and boom means, upon which said empennage means are mounted, secured to at least one of said fuselage or wing means and extending longitudinally rearwardly of said aircraft for defining moment arms between said aerodynamic centers of said vertical and horizontal stabilizers and said aerodynamic center of said fuselage-wing means, said empennage means being rotatably secured to said boom means about the longitudinal axis of said boom means so as to alter the positions of said vertical and horizontal stabilizers relative to a horizontal plane which normally includes said horizontal stabilizer for imparting to said aircraft substantially constant directional static stability throughout the subsonic, transonic, and high supersonic speed ranges as a result of said vertical and horizontal stabilizers acting through said moment arms.

2. An empennage assembly for aircraft, comprising:
a fuselage;
wing means secured to said fuselage for defining therewith an aerodynamic center;
empennage means, including a vertical stabilizer having an aerodynamic center, and a horizontal stabilizer having an aerodynamic center; and
boom means, upon which said empennage means are mounted, secured to at least one of said fuselage or wing means and extending longitudinally rearwardly of said aircraft for defining moment arms between said aerodynamic centers of said vertical and horizontal stabilizers and said aerodynamic center of said fuselage-wing means,
said empennage means being rotatably secured to said boom means about the longitudinal axis of said boom means so as to alter the positions of said vertical and horizontal stabilizers relative to a horizontal plane which normally includes said horizontal stabilizer and thereby effectively counteract the tendency of the composite aerodynamic center of said aircraft, as defined by said aerodynamic center of said fuselage-wing means and said aerodynamic centers of said vertical and horizontal stabilizers, to shift its longitudinal location in the longitudinal direction of said aircraft as said aircraft traverses the subsonic, transonic, and high supersonic speed ranges so as to impart to said aircraft substantially constant longitudinal static stability throughout said subsonic, transonic, and high supersonic speed ranges as a result of said vertical and horizontal stabilizers acting through said moment arms.

3. An empennage assembly for aircraft, comprising:
a fuselage;
wing means secured to said fuselage for defining therewith an aerodynamic center;
empennage means, including a vertical stabilizer having an aerodynamic center, and a horizontal stabilizer having an aerodynamic center; and
boom means, upon which said empennage means are mounted, secured to at least one of said fuselage or wing means and extending longitudinally rearwardly of said aircraft for defining moment arms between said aerodynamic centers of said vertical and horizontal stabilizers and said aerodynamic center of said fuselage-wing means,
said empennage means being rotatably secured to said boom means about the longitudinal axis of said boom means so as to alter the positions of said vertical and horizontal stabilizers relative to a horizontal plane which normally includes said horizontal stabilizer for simultaneously imparting to said aircraft substantially constant directional and longitudinal static stability throughout the subsonic, transonic, and high supersonic speed ranges as a result of said vertical and horizontal stabilizers acting through said moment arms.

4. An empennage assembly for aircraft, comprising:
a fuselage;
wing means secured to said fuselage for defining therewith an aerodynamic center;
empennage means, including a vertical stabilizer having an aerodynamic center, and a horizontal stabilizer having an aerodynamic center; and
boom means, upon which said empennage means are mounted, secured to at least one of said fuselage or wing means and extending longitudinally rearwardly of said aircraft for defining moment arms between said aerodynamic centers of said vertical and horizontal stabilizers and said aerodynamic center of said fuselage-wing means,
said empennage means being rotatably secured to said boom means about the longitudinal axis of said boom means so as to alter the positions of said vertical and horizontal stabilizers relative to a horizontal plane which normally includes said horizontal stabilizer for imparting to said aircraft substantially constant directional static stability throughout an angle of attack range of at least between 0°–15° as a result of said vertical and horizontal stabilizers acting through said moment arms.

5. An empennage assembly as set forth in claim 3, wherein:
said empennage means comprises at least two substantially different sized tail surfaces disposed mutually perpendicular with respect to each other;
said boom means includes a first fixed section secured to said at least one of said fuselage or wing means, and a second section rotatable relative to said first fixed section and said fuselage or wing means and upon which said empennage tail surfaces are mounted; and
means for rotating said second section of said boom means and said empennage tail surfaces as a function of Mach number such that during said subsonic speed range, the larger one of said tail surfaces will be disposed substantially horizontally while said smaller tail surface will be disposed substantially vertically, while during said supersonic speed range, the larger one of said tail surfaces will be disposed substantially vertically and said smaller tail surface will be disposed horizontally.

6. An empennage assembly as set forth in claim 4, wherein:
said empennage means comprises at least two substantially different sized tail surfaces disposed mutually perpendicular with respect to each other;
said boom means comprises a first fixed section secured to said at least one of said fuselage or wing means, and a second section rotatable relative to said first fixed section and said fuselage or wing means and upon which said empennage tail surfaces are mounted; and
means for rotating said second section of said boom means and said empennage tail surfaces as a function of angle of attack such that during low angle of attack modes, the larger one of said tail surfaces will be disposed substantially horizontally while said smaller tail surface will be disposed substantially vertically, while during high angle of attack modes, said larger one of said tail surfaces will be disposed substantially vertically and said smaller tail surface will be disposed substantially horizontally.

7. An empennage system as set forth in claim 5, wherein:
said means for rotating said boom means and said empennage tail surfaces rotates said boom means and said empennage tail surfaces in a smooth and continuous manner as a function of said Mach number such that during said transonic speed range, said larger and smaller tail surfaces will be disposed at predetermined angles relative to said horizontal and vertical planes.

8. An empennage system as set forth in claim 6, wherein:
said means for rotating said boom means and said empennage tail surfaces rotates said boom means and said empennage tail surfaces in a smooth and continuous manner as a function of said angle of attack such that during intermediate angle of attack modes, said larger and smaller tail surfaces will be disposed at predetermined angles relative to said horizontal and vertical planes.

9. An empennage assembly as set forth in claim 6, wherein:
during said high angle of attack modes, said larger one of said tail surfaces will be disposed vertically downwardly beneath said wing plane so as to fluidically interact with the high energy air flow passing beneath said wing means during said high angle of attack modes.

10. An empennage assembly as set forth in claim 3, wherein:
said boom means are secured to the tips of said wing means.

11. An empennage assembly as set forth in claim 3, wherein:
said boom means are secured to the trailing edges of said wing means.

12. An empennage assembly as set forth in claim 3, wherein:
said boom means are secured to said fuselage; and
said empennage means comprises two sets of mutually perpendicular tail surfaces of substantially different size.

13. An empennage assembly as set forth in claim 10, wherein:
said aircraft additionally comprises aft horizontal stabilizer means.

14. An empennage assembly as set forth in claim 10, wherein:
said aircraft additionally comprises canard surface means.

15. An empennage assembly as set forth in claim 5, wherein:
said boom means are secured to the tips of said wing means; and
said horizontally disposed tail surfaces of said empennage means are disposed outboard of said aircraft so as to fluidically interact with the upwash flow region generated by said wing means.

16. An empennage assembly as set forth in claim 6, wherein:
said empennage means is disposed upon a vectored thrust STOL aircraft; and
during said high angle of attack modes, said larger one of said tail surfaces will be disposed vertically downwardly beneath said wing plane so as to fluidically interact with the high energy air flow passing beneath said wing means during said high angle of attack mode, while said smaller tail surface is disposed within said horizontal plane so as to shift the aerodynamic center of said aircraft forwardly and thereby increase the lift characteristics of said aircraft to balance the force and moments of said vectored thrust.

17. An empennage assembly as set forth in claim 4, wherein:
said empennage means comprises at least two substantially different sized tail surfaces disposed mutually perpendicular with respect to each other;
said boom means comprises a first fixed section secured to said at least one of said fuselage or wing means, and a second section rotatable relative to said first fixed section and said fuselage or wing means and upon which said empennage tail surfaces are mounted; and
means for rotating said second section of said boom means and said empennage tail surfaces as a function of angle of attack such that during subsonic low angle of attack modes, the larger one of said tail surfaces will be disposed substantially horizontally while said smaller tail surface will be disposed substantially vertically upwardly, while during subsonic high angle of attack modes, said larger one of said tail surfaces will be disposed substantially horizontally 180° out of phase with respect to its position during said low angle of attack mode while said smaller tail surface will be disposed vertically downwardly.

18. An empennage assembly as set forth in claim 17, wherein:
said empennage means is disposed upon a vectored thrust STOL aircraft; and
during said high angle of attack modes, said larger one of said tail surfaces will be disposed within the downwash regions of said aircraft wing means so as to shift the aerodynamic center of said aircraft forwardly and thereby increase the lift characteristics of said aircraft to balance the force and moments of said vectored thrust, while said smaller tail surface is disposed vertically downwardly beneath said wing plane so as to fluidically interact with the high energy air flow passing beneath said wing means during said high angle of attack mode.

19. An empennage assembly as set forth in claim 1, wherein:
said empennage means comprises at least two substantially different sized tail surfaces disposed mutually perpendicular with respect to each other;
said boom means includes a first fixed section secured to said at least one of said fuselage or wing means, and a second section rotatable relative to said first fixed section and said fuselage or wing means and upon which said empennage tail surfaces are mounted; and
means for rotating said second section of said boom means and said empennage tail surfaces as a function of Mach number such that during said subsonic speed range, the larger one of said tail surfaces will be disposed substantially horizontally while said smaller tail surface will be disposed substantially vertically, while during said supersonic speed range, the larger one of said tail surfaces will be disposed substantially vertically and said smaller tail surface will be disposed substantially horizontally.

20. An empennage assembly as set forth in claim 2, wherein:

said empennage means comprises at least two substantially different sized tail surfaces disposed mutually perpendicular with respect to each other;

said boom means includes a first fixed section secured to said at least one of said fuselage or wing means, and a second section rotatable relative to said first fixed section and said fuselage or wing means and upon which said empennage tail surfaces are mounted; and means for rotating said second section of said boom means and said empennage tail surfaces as a function of Mach number such that during said subsonic speed range, the larger one of said tail surfaces will be disposed substantially horizontally while said smaller tail surface will be disposed substantially vertically, while during said supersonic speed range, the larger one of said tail surfaces will be disposed substantially vertically and said smaller tail surface will be disposed substantially horizontally.

* * * * *